United States Patent [19]

Lutzeler

[11] Patent Number: 5,057,948

[45] Date of Patent: Oct. 15, 1991

[54] RECORDING OF DIGITAL SIGNALS ON D.C.-ERASED MAGNETIC TAPE

[75] Inventor: Jorn Lutzeler, Zwingenberg, Fed. Rep. of Germany

[73] Assignee: BTS Broadcast Television Systems GmbH, Darmstadt, Fed. Rep. of Germany

[21] Appl. No.: 386,281

[22] Filed: Jul. 27, 1989

[30] Foreign Application Priority Data

Aug. 12, 1988 [DE] Fed. Rep. of Germany ....... 3827370

[51] Int. Cl.$^5$ .......................... G11B 5/03; G11B 15/04; G11B 5/09
[52] U.S. Cl. ......................................... 360/66; 360/60; 360/46; 360/67
[58] Field of Search .................... 360/66, 25, 58, 46, 360/60, 67

[56] References Cited

U.S. PATENT DOCUMENTS

| | | | |
|---|---|---|---|
| 3,369,081 | 2/1968 | Atsumi | 360/66 |
| 3,611,329 | 10/1971 | Lee | 360/66 |
| 4,713,700 | 12/1987 | Kuwahara et al. | 360/66 |
| 4,769,724 | 9/1988 | Kusunoki et al. | 360/66 |

Primary Examiner—A. J. Heinz
Assistant Examiner—Varsha V. Sheladia
Attorney, Agent, or Firm—Frishauf, Holtz, Goodman & Woodward

[57] ABSTRACT

In order to avoid distortion of digital signals recorded on a magnetic tape following erasure of the recording tracks by a d.c. erase head, a compensating magnetic bias field opposed to the remanent erase field is superimposed upon the field recorded by the digital signals. This may be produced by superimposing a direct current on the recording current furnished to the recording head, either directly or by superimposing a bias voltage at the input of the recording amplifier. A separate magnetic head following the erase head and preceding the recording head may also be used to produce the compensating bias field.

5 Claims, 1 Drawing Sheet

RECORDING OF DIGITAL SIGNALS ON D.C.-ERASED MAGNETIC TAPE

This invention concerns electro-magnetic tape recording apparatus for recording digital signals when the tape has been erased by an erase head energized by direct current.

Various kinds of erasing processes are used for erasing magnetic recordings. For example, for erasing of digital video recordings on a magnetic tape, both constant magnetic fields and alternating magnetic fields are in use. It has ben found that in the reproduction of signals that are recorded on magnetic tape where the recording tracks have been erased by the constant magnetic field produced by a direct current in an erase head, there is a pulse distortion that results that is a disadvantage compared to recordings on tapes utilizing alternating current erasing.

SUMMARY OF THE INVENTION

It is an object of the present invention to provide means for recording digital signals on d.c.-erased magnetic tapes in a manner which permits the reproduction of recorded signals substantially without distortion.

Briefly, while a digital signal is recorded, a constant magnetic bias field opposite to the constant magnetization of the tape produced by d.c. erasing, for compensating the latter, is superimposed on the recording signal field and is effective at the time the digital signals are recorded by a recording head.

In one embodiment of the invention, a recording amplifier is provided both with the signals to be recorded and a d.c. voltage at an input, or at respective inputs, of the amplifier for providing the superimposed field on the record.

In another embodiment the recording amplifier is coupled through a blocking capacitor with a recording head, while a source of d.c. current is connected through a resistance to the same recording head. In still another embodiment separate windings are provided on the recording head respectively for the digital signals and for direct current. In still another embodiment the recording amplifier has a transmission characteristic which is asymmetrical, so that a d.c. component is produced in its output from the digital signals and is superimposed on them. Still another embodiment of the invention makes use of a permanent magnet rather than d.c. current for producing the compensating constant magnetic bias field. In one such embodiment a permanent magnet is interposed in the magnetic circuit that includes the core of the recording head.

BRIEF DESCRIPTION OF THE DRAWINGS

The invention is further described by way of illustrative example with reference to the annexed drawings in which.

DESCRIPTION OF THE ILLUSTRATED EMBODIMENTS

Figure 1:
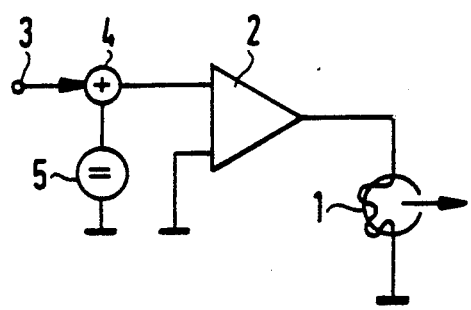
FIG. 1 is a basic circuit diagram of a first embodiment of the invention.

In the embodiment shown in FIG. 1 a recording head 1 is supplied with recording current from a recording amplifier 2. The digital signal to be recorded is supplied to one input 3 of the circuit shown and reaches the input of the recording amplifier through an addition circuit 4. A d.c. voltage is supplied from a d.c. voltage source 5 to the addition circuit 4, so that the sum of the d.c. voltage and the signal is provided to the recording amplifier 2 and is furnished to the recording head 1 in the form of recording current.

Instead of the addition circuit 4, which is illustrated in FIG. 1 as a circuit preceding the recording amplifier 2, the recording amplifier 2 can be constituted either with two corresponding inputs or can be constituted internally so that its output, and therefore the signal furnished to the recording amplifier, is asymmetrical and therefore contains a d.c. component.

Figure 2:
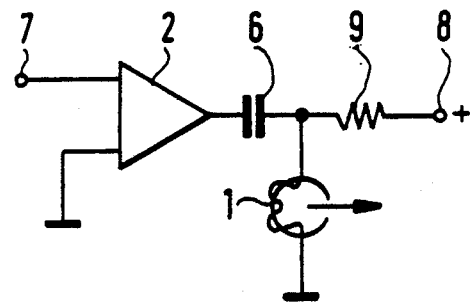
FIG. 2 is a basic circuit diagram of a second embodiment of the invention.

In the embodiment illustrated in FIG. 2, the recording amplifier 2 has its output A.C.-coupled to the recording head 1 through a capacitor 6, so that only the amplified signal supplied at 7 from the output of the amplifier reaches the recording head 1 through this coupling. For generating a supplementary constant field a direct current is supplied from the positive pole 8 of a d.c. source not specifically shown, through a resistance 9, to the recording head 1.

Figure 3:
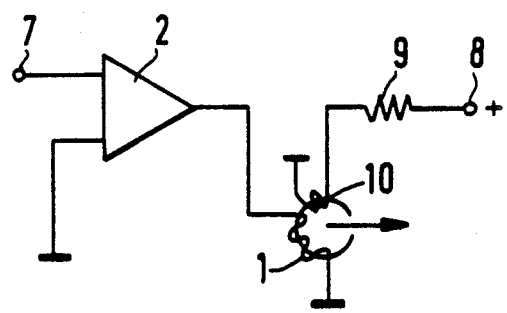
FIG. 3 is a basic circuit diagram of a third embodiment of the invention.

In the embodiment shown in FIG. 3 a second winding 10 is provided through which a direct current flows from the positive pole 8 of a d.c. voltage source, through a resistance 9. The winding of the recording head 1 which is provided for the signal is connected directly to the output of the recording amplifier 2.

Figure 4:
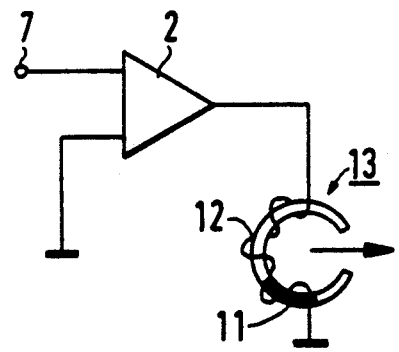
FIG. 4 is a basic circuit diagram of a fourth embodiment of the invention.

The compensating magnetic bias field can also be produced with the help of a permanent magnet 11 inserted in the magnetic circuit 12 of the recording head 13, as shown schematically in FIG. 4.

Figure 5:
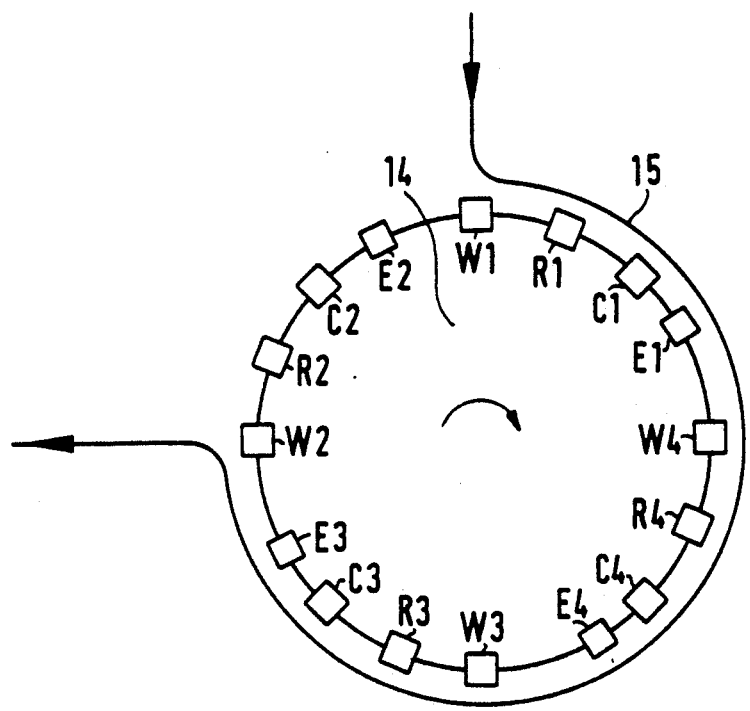
FIG. 5 is a schematic representation of a system in which the compensating magnetic field is provided by a separate magnetic head, this figure illustrating the disposition of magnetic heads for four recording channels disposed around the periphery of a headwheel used for scanning the magnetic tape obliquely in recording and playback.

Finally, for generating the compensating bias field a supplementary magnetic head can be provided. FIG. 5 shows for example a head wheel 14, around which a magnetic tape 15 is looped over an angle of about 270°. There are disposed around the circumference of the head wheel 14, in the well known way, four recording heads W1 to W4, four erase heads E1 to E4 and four playback heads R1 to R4. In addition, for generating the compensating bias field, additional magnetic heads (compensation heads) C1 to C4 are provided, in each case between an erase head and a recording head. In this arrangement the compensation heads C1 to C4 may be energized from the same source of direct current as the erase heads, through one or more suitable branch circuits, since they need to be activated only during recording when the erase heads are also activated and should be turned off when the playback heads R1 to R4 are in use.

Although the invention is described with reference to particular illustrative embodiments, it will be understood that further variations and modifications are possible within the inventive concept.

I claim:

1. A circuit apparatus for recording a digital signal on a d.c.-erased magnetic tape, comprising:

a recording magnetic head disposed for scanning oblique tracks on said d.c.-erased magnetic tape, means for providing a recording digital signal current, which current corresponds to the digital signal to be recorded, and means for superimposing a d.c. current on said recording digital signal current in such a way that said d.c. current is effective, at the time said digital signal is recorded by said magnetic head, for compensating a d.c. field resulting from the d.c. erasing of said tape.

2. The apparatus of claim 1, wherein said d.c. current superimposing means comprises a recording amplifier (2) connected to said recording head, having both said digital signal and a d.c. voltage input signal supplied to said amplifier, said recording amplifier being capable of superimposing said d.c. voltage on said digital signal at least in an output of said amplifier supplied to said recording head.

3. The apparatus of claim 1, further comprising a recording amplifier (2), said recording amplifier having an input connected to a source of said digital signal and having an output connected through a blocking capacitor (6) to said recording head (1), and further comprising means for supplying a direct current through a resistance (9) to said recording head for compensating a magnetic field resulting from d.c. erasing of said tape.

4. The apparatus of claim 1, wherein said d.c. current superimposing means comprises a recording amplifier having an output connected to said recording head and having an input connected to a source of said digital signal, said amplifier having an asymmetric transmission characteristic relative to a median voltage level of said digital signal, whereby a d.c. component is generated and is superimposed on the digital signal as it is recorded.

5. The apparatus of claim 1, further comprising a recording amplifier (2) having an input connected to a source of said digital signal and having an output connected to said recording head, said recording head incorporating said d.c. current superimposing means and having a core, said core having a first winding thereon which is connected to the output of said recording amplifier (2) and also having a second winding thereon connected to a source of direct current.

* * * * *